(12) United States Patent
Kitani et al.

(10) Patent No.: US 8,611,840 B2
(45) Date of Patent: Dec. 17, 2013

(54) MOBILE COMMUNICATION TERMINAL AND METHOD FOR INDICATING RECEIVED-SIGNAL STRENGTH

(75) Inventors: Mitsuhiro Kitani, Yokohama (JP); Hidenori Sakaniwa, Kawasaki (JP)

(73) Assignee: NEC Corporation, Tokyo (JP)

( * ) Notice: Subject to any disclaimer, the term of this patent is extended or adjusted under 35 U.S.C. 154(b) by 1275 days.

(21) Appl. No.: 11/370,409

(22) Filed: Mar. 8, 2006

(65) Prior Publication Data

US 2006/0205371 A1    Sep. 14, 2006

(30) Foreign Application Priority Data

Mar. 10, 2005    (JP) ................................. 2005-066805

(51) Int. Cl.
*H04B 17/00* (2006.01)
(52) U.S. Cl.
USPC .......................... 455/226.2; 455/421; 455/566
(58) Field of Classification Search
USPC ................................................. 455/421, 566
See application file for complete search history.

(56) References Cited

U.S. PATENT DOCUMENTS

| | | | | |
|---|---|---|---|---|
| 6,546,263 B1 * | 4/2003 | Petty et al. | ..................... | 455/566 |
| 2005/0264472 A1 * | 12/2005 | Rast | ................................ | 345/30 |

FOREIGN PATENT DOCUMENTS

| | | | |
|---|---|---|---|
| JP | 11-187451 | | 7/1997 |
| JP | 11187451 | * | 7/1999 |
| JP | 2001-036937 | | 2/2001 |
| JP | 2001-36937 | | 2/2001 |
| JP | 2001-136581 | | 5/2001 |
| JP | 2002-34077 | | 1/2002 |
| JP | 2002-44729 | | 2/2002 |
| JP | 2002-051119 | | 2/2002 |
| JP | 2002-057619 | | 2/2002 |
| JP | 2002044729 | * | 2/2002 |
| JP | 2003-309530 | | 10/2003 |
| JP | 2004-128976 | | 4/2004 |
| JP | 2004-320369 | | 11/2004 |

* cited by examiner

*Primary Examiner* — Patrick Edouard
*Assistant Examiner* — Shantell L Heiber
(74) *Attorney, Agent, or Firm* — Cozen O'Connor (57) ABSTRACT

In a mobile communication terminal, a communication control section controls communication on the basis of a selected radio communication system or frequency band and manages the state of communication. A signal-strength-indicator acquiring and storing section acquires signal-strength indicators and stores it. A communication-state acquiring section acquires the state of communication. A signal-strength-indication displaying control section determines whether a radio communication system or a frequency band is being searched for from the communication state. When it is being searched for, antenna bars indicative of signal strength are not shown or flashed when the signal-strength indicator is indicated on a display section.

10 Claims, 5 Drawing Sheets

MOBILE COMMUNICATION TERMINAL AND METHOD FOR INDICATING RECEIVED-SIGNAL STRENGTH

CROSS-REFERENCE TO RELATED APPLICATION

This application is based upon and claims the benefit of priority from the prior Japanese Patent Application No. 2005-066805, filed Mar. 10, 2005, the entire contents of which is incorporated herein by reference.

BACKGROUND OF THE INVENTION

1. Field of the Invention

The present invention relates to a mobile communication terminal including a signal-state indicator system and a method for indicating received-signal strength.

2. Description of the Related Art

Radio communication systems include time division multiple access (TDMA), code division multiple access (CDMA), wireless LAN, infrared wireless communication and other various communication systems. Accordingly, services for mobile communication terminals incorporating a radio function including these plural radio communication systems are expanding. The mobile communication terminals generally switch multiple radio communication systems and multiple frequency bands as needed. Thus, a newly devised technique for indicating signal-strength information to users grows in importance.

In mobile communication terminals that transfer information by radio, the signal condition changes every moment under the influence of the position, surrounding obstacles, and movement. Accordingly, received-signal-strength indication is used to give the users the present availability of the terminals: in general, multiple antenna bars are indicated. In a strong signal condition, the number of antenna bars is increased; in a weak signal condition, the number of antenna bars is decreased. A state in which radio communication is unavailable is indicated as "out of range" (e.g., refer to Japanese Laid-Open Patent Application No. JP-A-2002-34077). Terminals incorporating multiple communication systems also include a system in which antennas corresponding to the number of the communication systems are displayed to indicate the respective received-signal strengths (e.g., refer to Japanese Laid-Open Patent Application No. JP-A-2002-44729).

The foregoing techniques disclosed in JP-A-2002-34077 and JP-A-2002-44729 are for notifying users of a received-signal condition that changes every moment under the influence of the position, surrounding obstacles, and movement, not for notification of the signal condition during the switching of communication systems, or frequency bands. The technique disclosed in JP-A-2002-44729 is not for displaying the signal condition during the switching of multiple communication systems with one antenna indicator.

In communication terminals incorporating a control function capable of selectively switching communications in mobile communication systems having multiple radio communication systems or multiple frequency bands (hereinafter, referred to as communication systems), when a specific communication system is continuously monitored but the other available communication systems are not monitored, the signal condition of the system to which the terminal is switched can be known only after the completion of switching.

Therefore, the technique described in JP-A-2002-34077 has the problem that when the signal condition changes greatly before and after switching, the antenna-bar indicator changes significantly when performing switching.

Also, when the signal condition of the system to which the terminal is switched is poor, the terminal again switches the communication system to search for an available communication system making it inconvenient for the user.

Furthermore, the technique described in JP-A-2002-44729 has the problem that the signal condition at the switching of communication cannot be displayed with one antenna indicator making it inconvenient for the user.

SUMMARY OF THE INVENTION

The invention has been made in view of the above-described circumstances. Accordingly, it is an object of the invention to provide a mobile communication terminal and a method for indicating signal strength capable of reducing information unnecessary for users and providing advantageous signal-strength indication.

In order to achieve the above object, according to an aspect of the invention, there is provided a mobile communication terminal having a control function for selectively switching a plurality of radio communication systems or a plurality of frequency bands, the terminal comprising: a communication control means for selecting the plurality of radio communication systems or the plurality of frequency bands, controlling communication based on a selected radio communication system or frequency band and managing the communication state; a signal-strength-indicator acquisition means for acquiring received-signal-strength indicators; a communication-state acquisition means for acquiring the communication state from the communication control means; a search determination means for determining whether the radio communication system or the frequency band selected by the communication control means is being searched according to the communication state acquired by the communication-state acquisition means; a signal-strength displaying indicator operation means for calculating signal-strength displaying indicators from the signal-strength indicators acquired by the signal-strength indicator acquisition means according to the determination of the search determination means; a signal-strength indicator displaying means for displaying the signal-strength indicator calculated by the signal-strength displaying indicator operation means; and a signal-strength-indicator displaying control means for controlling the signal-strength displaying indicator by the way of indication according to the determination by the search determination means when signal-strength indicators are displayed on the signal-strength indication displaying means.

In order to achieve the above object, according to another aspect of the invention, there is provided a mobile communication terminal having a control function for selectively switching a plurality of radio communication systems or a plurality of frequency bands, the terminal comprising: a communication control means for selecting the plurality of radio communication systems or the plurality of frequency bands, controlling communication based on a selected radio communication system or frequency band and managing the communication state; a signal-strength indicator acquisition means for acquiring received-signal-strength indicators; a communication-system-information acquisition means for acquiring communication-system information including the radio communication system or the frequency band selected by the communication control means; a communication-system-information storage means for storing the communication-system information acquired by the communication-system information acquisition means; a communicationsystem-information comparison means for comparing previous communication-system information stored in the communication-system-information storage means with the present communication-system-information acquired by the communication-system-information acquisition means, and determining whether there is difference between the pieces of information; a search determination means for determining whether the radio communication system or the frequency band selected by the communication control means is being searched according to the result of comparison by the communication-system-information comparison means; a signal-strength displaying indicator operation means for calculating signal-strength displaying indicators from the signal-strength indicators acquired by the signal-strength indicator acquisition means according to the determination by the search determination means; a signal-strength indicator displaying means for displaying the signal-strength indicator calculated by the signal-strength-indicator operation means; and a signal-strength-indicator displaying control means for controlling the signal-strength displaying indicator by the way of indication according to the determination by the search determination means when signal-strength indicators are displayed on the signal-strength indication displaying means.

In order to achieve the above object, according to still another aspect of the invention, there is provided a method for indicating signal strength of a mobile communication terminal having a control function for selectively switching a plurality of radio communication systems or a plurality of frequency bands, the method comprising the steps of: acquiring received-signal-strength indicators and communication state; determining whether the radio communication system or the frequency band in use is being switched according to the acquired communication state; calculating a signal-strength displaying indicator from the acquired signal-strength indicator according to the determination on searching; and displaying the calculated signal-strength displaying indicator according to a method of indication based on the determination on searching when the acquired calculated signal-strength displaying indicator is displayed.

In order to achieve the above object, according to further still another aspect of the invention, there is provided A method for indicating signal strength of a mobile communication terminal having a control function for selectively switching a plurality of radio communication systems or a plurality of frequency bands, the method comprising the steps of: acquiring received-signal-strength indicators, communication state, and communication-system information including the radio communication system and the frequency band that are in use at the present; comparing previous communication-system information with the present communication-system information to determine whether there is a difference between the pieces of information; determining whether the radio communication system or the frequency band is being searched for according to the result of comparison; calculating signal-strength displaying indicators from the acquired signal-strength indicators according to the determination on searching; and controlling to display the calculated signal-strength displaying indicator by the way of indication according to the determination on searching.

According to the present invention, the method of indicating and calculating signal strength can be changed until the completion of communication-system switching operation. During the switching or while a communication system is searched, signal-strength information that is unnecessary for the user is displayed by an indication method based on the result of determination on searching. This offers the advantage of reducing unnecessary information for the user to provide advantageous signal-strength indication. Furthermore, this provides the advantage of allowing the user to perform communication without realizing the change of the radio communication system and available frequency band.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings.

Communication terminals using radio communication techniques, typified by mobile phones and mobile communication terminals, are connected to base stations located in various places and servers, thereby allowing conversation and data communication with other terminals via communication networks. Radio communication systems include TDMA, CDMA, wireless LAN, infrared wireless communication, and other various communication systems. Accordingly, mobile telephone services incorporating these plural radio communication systems are expanding. Also, there are mobile communication terminals incorporating a control function capable of selectively switching available frequency bands to perform radio communication using multiple frequency bands.

The invention relates to a technique for mobile communication terminals incorporating multiple systems, such as a control function for selectively switching multiple radio communication systems or frequency bands to be used, when communicating through selective switching of a communication system depending on the circumstances, the technique for switching a method of determining the signal condition and a method of displaying it to provide advantageous signal-strength indicator by reducing information unnecessary for users.

In addition, in the following explanation, a received signal strength indicator shows the technical term corresponding to the electric wave intensity received at the terminal of information. Concerning this case, although there are expressions of a received signal strength indicator, signal strength information, electric wave intensity information, electric wave indicator, or electric wave information, etc., they are all the same.

Moreover, in order to display a received signal strength displaying indicator or signal strength indicator information, etc., on display section, such as a display device, the new signal strength displaying information computed using signal strength indicator is expressed. Also, the expression of displaying, indicating, etc. is used for a displaying operation.

A. First Embodiment

A-1. Structure of First Embodiment

Figure 1:
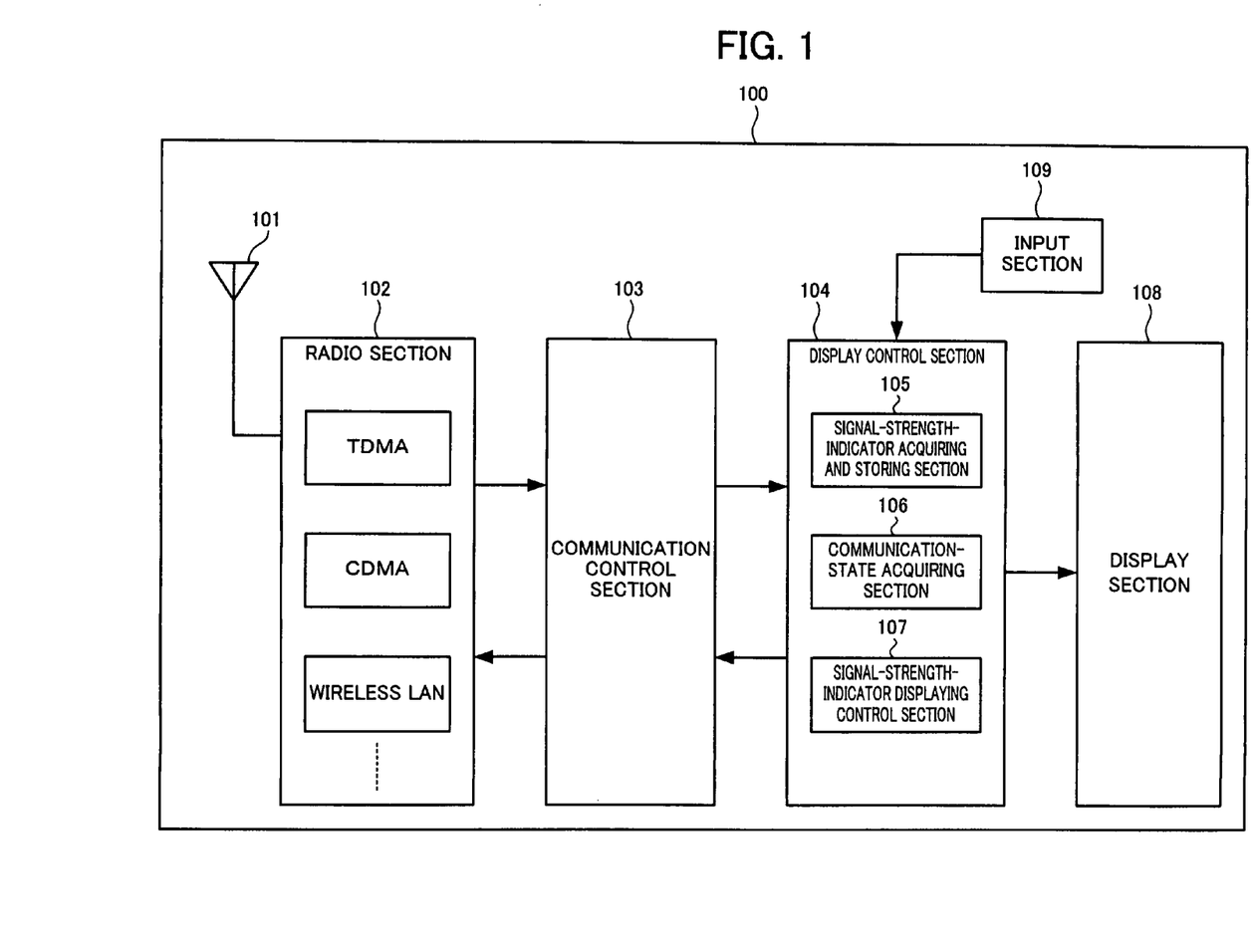
FIG. 1 is a block diagram showing the structure of a mobile communication terminal according to the first embodiment of the invention.

FIG. 1 is a block diagram showing the structure of a mobile communication terminal according to the first embodiment of the invention. In the drawing, reference numeral 100 denotes a mobile communication terminal according to the first embodiment. An antenna 101 transmits and receives signals for the communication of the mobile communication terminal 100. A radio section 102 includes a modulator and demodulator circuit and a communication protocol for use in multiple mobile communication systems. For example, the radio section 102 includes a modulator and demodulator circuit for CDMA and wireless LAN, or a modulator and demodulator circuit for multiple frequency band classes and a plurality of communication protocols. A communication control section 103 acquires a received-signal-strength indicator (signal-strength information about a received signal) from the radio section 102, selects a communication system from the radio section 102, and controls the communication, thereby managing the state of communication in a manner that depends on the condition of communication.

For example, the state of communication includes "an idle state", "a connect state", "an access state", and "a communication-system switching-over or searching state". The "communication-system switching-over or searching state" indicates a state in which when the communication control section 103 has lost track of a communication system in use, it is searching for another communication system while switching communication systems; a state in which when a communication system better than the present communication system is found while the mobile terminal is moving, the communication control section 103 is switching the present communication system to the better system; or a state in which when a user specifies the order of the acquisition of a communication system or requests to switch the communication to search all the communication systems that the terminal supports, the communication control section 103 is searching for another communication system.

A display control section 104 includes a signal-strength-indicator acquiring and storing section 105, a communication-state acquiring section 106, and a signal-strength-indicator displaying control section 107. The signal-strength-indicator acquiring and storing section 105 acquires signal-strength indicator from the communication control section 103 and stores it. The communication-state acquiring section 106 acquires communication-state information from the communication control section 103. The signal-strength-indicator displaying control section 107 performs an operation for indicating signal strength on the basis of signal-strength indicator and communication-state information, and transmits the information to be displayed to a display section 108. The display section 108 displays the information received from the display control section 104 for the user. An input section 109 receives input from the user, and notifies the display control section 104 of operating information from the user such as switching the signal-strength indicator.

A-2. Operation of First Embodiment

Figure 2:
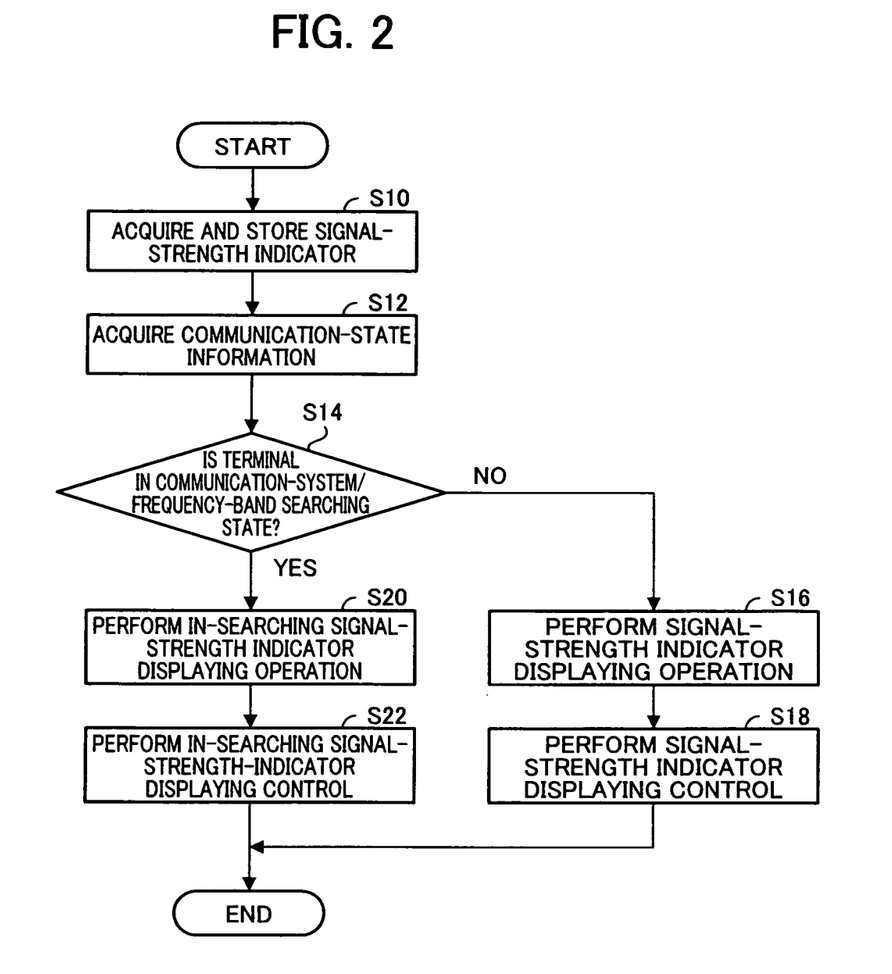
FIG. 2 is a flowchart showing the operation indicating signal strength by a signal-strength-indicator displaying control section 107 according to the first embodiment while the communication system is switched.

The operation of the first embodiment will be described. FIG. 2 is a flowchart showing the operation indicating signal strength by the signal-strength-indicator displaying control section 107 according to the first embodiment while the communication system is switched. The signal-strength indicator is acquired and stored from the signal-strength-indicator acquiring and storing section 105 (step S10), and information on the present communication state of the terminal is acquired from the communication-state acquiring section 106 acquires (step S12). The communication-state information includes information indicative of whether the terminal is in the above-described "communication-system searching state".

It is then determined whether the terminal is in "a communication-system searching state" from the acquired communication-state information (step S14). For example, it may be determined using a communication-system searching determination flag. While the communication control section 103 is controlling the radio section 102 to switch the communication, the communication-system searching determination flag is turned on during which it is determined to be in "searching state". When the flag is turned off, it is determined not to be in "searching state". Thus, the determination flag allows a determination whether or not the terminal is in "a communication-system searching state".

When it is determined that the terminal is not in the "searching state", a normal signal-strength indicator displaying operation (step S16) is performed and then a signal-strength-indicator displaying control process for indicating signal-strength indicator information on the display section 108 is performed (step S18). The normal signal-strength indicating operation is, for indicating antenna bars on the display section 108, an operation of calculating the number of antenna bars responsive to the signal strength. For numerical indication of signal-strength indicator, an operation of calculating numerical values easy to understand for users is performed using a specified function.

When the unit of signal-strength indicator information varies among communication systems, an operation of unifying the units of indication is performed. Examples of the operation method include a method of using acquired signal-strength indicator information as it is, a method of processing the values so that they fall within a specified range by multiplying a correction value α (α is an arbitrary constant) to indicate signal-strength indicator information, and a method of averaging the values of a fixed time from a past certain time to the present time. By these operations, for example when indicating an antenna bar, the desired number of antenna bar display data is generated according to the results of an operation such as "out of range" or 0-3 antenna bars, etc.

When it is determined to be in the "searching state" in step S14, an in-searching signal-strength indicator displaying operation process different from normal one is performed (step S20), and then an in-searching signal-strength indicator displaying control process for indicating signal-strength information on the display section 108 is performed (step S22).

The signal-strength indicating operation different from normal one includes, e.g., an operation of switching the method of indication in addition to the operation for calculating the number of antenna bars.

Figure 5:
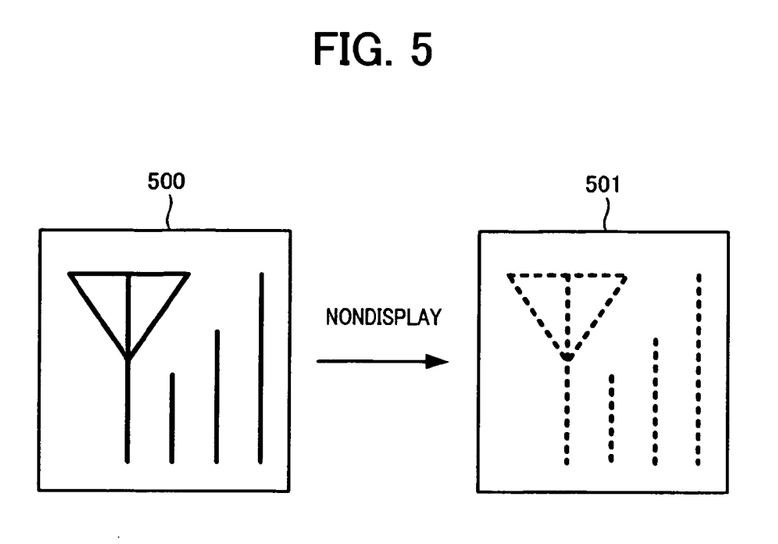
FIG. 5 is a schematic diagram of an example of a signal-strength indicator on display section 108 when it is determined to be searching.
Figure 6:
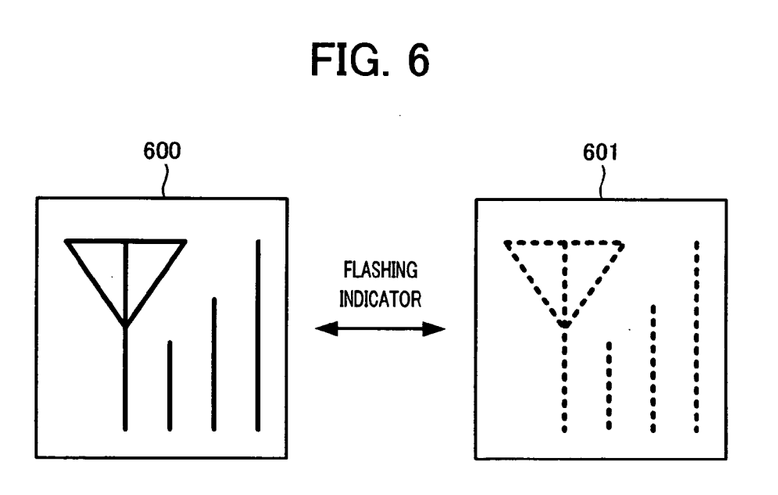
FIG. 6 is a schematic diagram of another example of a signal-strength indicator on the display section 108 when it is determined to be searching.

Here, FIGS. 5 and 6 are schematic diagrams showing examples of a signal-strength indicator displayed on the display section 108 when it is determined to be in a searching state. The indication is switched from a displayed state 500 to a nondisplayed state 501 as shown in FIG. 5, or the indication is blinked by cycling a displayed state 600 and a nondisplayed state 601 at specified intervals as shown in FIG. 6. Accordingly, additional information such as a flag indicative of nondisplay or blink indication may be added to the indication control for the display section 108.

Examples of the operating method in step S20 may include a method of multiplying a correction value β (β is an arbitrary constant) different from that for the above-described normal operation (step S16), a method in which the number N of data for averaging is increased using the signal-strength information of previous N times (N is an arbitrary constant) of the communication system that has been available so far and the signal-strength information on the communication system that has been available so far is acquired as much as possible during searching, a method of continuously using signal-strength information directly before searching without acquiring signal-strength information during searching, and a method of directly using the previous signal-strength information of a fixed time.

There may be a case where a signal-strength indicator fluctuates greatly when searching a signal that is not present at the area during the switching of the communication system, because there is no information acquired in the signal-strength-information acquiring and storing section 105. However, the information on the fluctuation of the signal strength due to the fact that the terminal is searching for a signal that is absent in the area is not so important for the user. Thus, in this case, it is determined to be in a communication-system searching state, and so the way of indicating signal strength is switched and as such, indication of information unnecessary for the user can be reduced.

Also, when the user requests to indicate signal-strength indicator in "a communication-system searching state", a normal signal-strength indicating operation is performed in step S20 and then a process for indicating signal-strength information is performed in step S22 using the operation result. When the user requests to indicate communication-system information of "a communication-system searching state", the name of the communication system that is now searching may be displayed in step S22.

Furthermore, when the user requests both of the signal-strength indication and communication-system indication of "communication-system searching state", a combination of the two foregoing methods may be employed. For the request for both of the signal-strength indication and communication-system indication in "communication-system searching state", the user may want to know more detailed information on the communication state during the "communication-system searching state". Accordingly, the indication of the information will increase the convenience for the user.

The communication-state information described in step S12 may be information indicative of whether communication is available or not. The method for determining whether communication is available may be a method similar to that in "a communication-system searching state". The similar method is a method of monitoring a communication state by the communication-state acquiring section 106 using a communication-availability determination flag.

When the communication is in "an idle state" or "a connect state", the determination flag is turned on which indicates that "communication is available". On the other hand, when the determination flag is OFF, it indicates that "communication is unavailable". Thus the determination flag allows a determination whether "communication is available". When it is determined to be "communication available" in step S14, the procedure moves to step S20; when it is determined to be "communication unavailable", the procedure moves to step S16, wherein the same process as that for "searching for a communication system" is performed.

There may be a case where signal-strength indication fluctuates greatly when a mobile communication terminal searches for a signal that is absent in the area and so it acquires no signal-strength information in "an unavailable communication state". However, the information on the fluctuation of the signal strength due to the fact that the terminal is searching for a signal that is absent in the area is not so important for the user. Thus, in this case, it is determined whether the terminal is in "a communication-system searching state" and the method of indicating signal-strength information is switched. As such, indication of information unnecessary for the user can be reduced.

Although FIGS. 5 and 6 show a signal-strength indicator using antenna bars, the indicator may be numerical values or a line graph. Alternatively, the user may be allowed to select the method of indication of blink or nondisplay using the input section 109. Any of the indications may be specified to the individual terminals. This further improves the convenience for the user.

For the determination of step S14 of whether the terminal is in "a communication-system searching state", a difference in signal strength before and after searching may be calculated, wherein when the difference is more than a specified value, the procedure moves to step S20; when the difference is smaller than a specified value, the procedure moves to step S16. Accordingly, when the signal strengths before and after searching are the same even during searching, the conventional antenna-bar indication can be used, providing advantageous a signal-strength indicator for the user.

B. Second Embodiment

The second embodiment of the invention will next be described.

B-1. Structure of Second Embodiment

Figure 3:
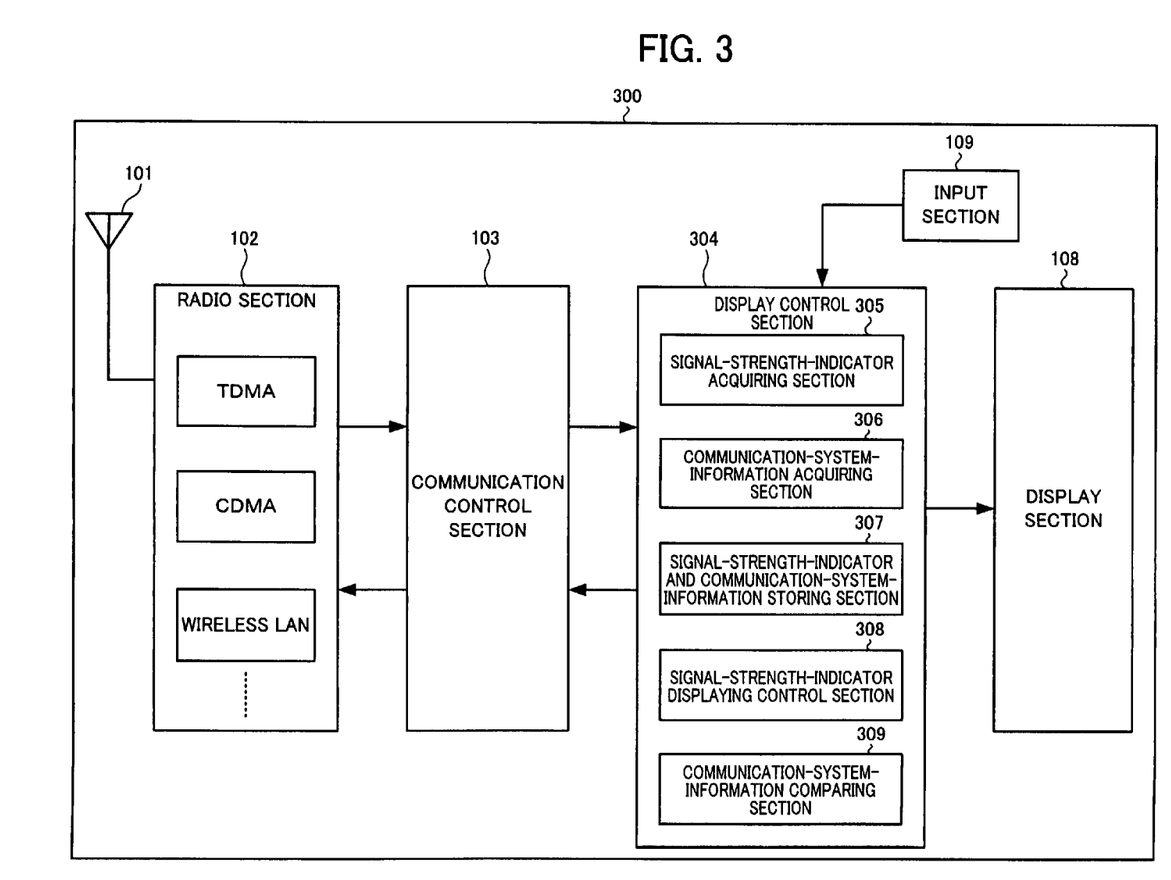
FIG. 3 is a block diagram showing the structure of a mobile communication terminal according to the second embodiment of the invention.

FIG. 3 is a block diagram showing the structure of a mobile communication terminal according to a second embodiment of the invention. Components corresponding to those of FIG. 1 are given the same reference numerals and their description will be omitted. In the drawing, reference numeral 300 denotes a mobile communication terminal according to a second embodiment. A display control section 304 includes a signal-strength-information acquiring section 305, a communication-system-information acquiring section 306, a signal-strength-information and communication-system-information storing section 307, a signal-strength-indicator displaying control section 308, and a communication-system-information comparing section 309. The communication-system information indicates a communication system and an available frequency band. The signal-strength-information acquiring section 305 and the communication-system-information acquiring section 306 acquire necessary information from a communication control section 303. The communication-system-information comparing section 309 performs an operation on the basis of the information. The operation result is displayed on the display section 108 for transmission.

B-2. Operation of Second Embodiment

Figure 4:
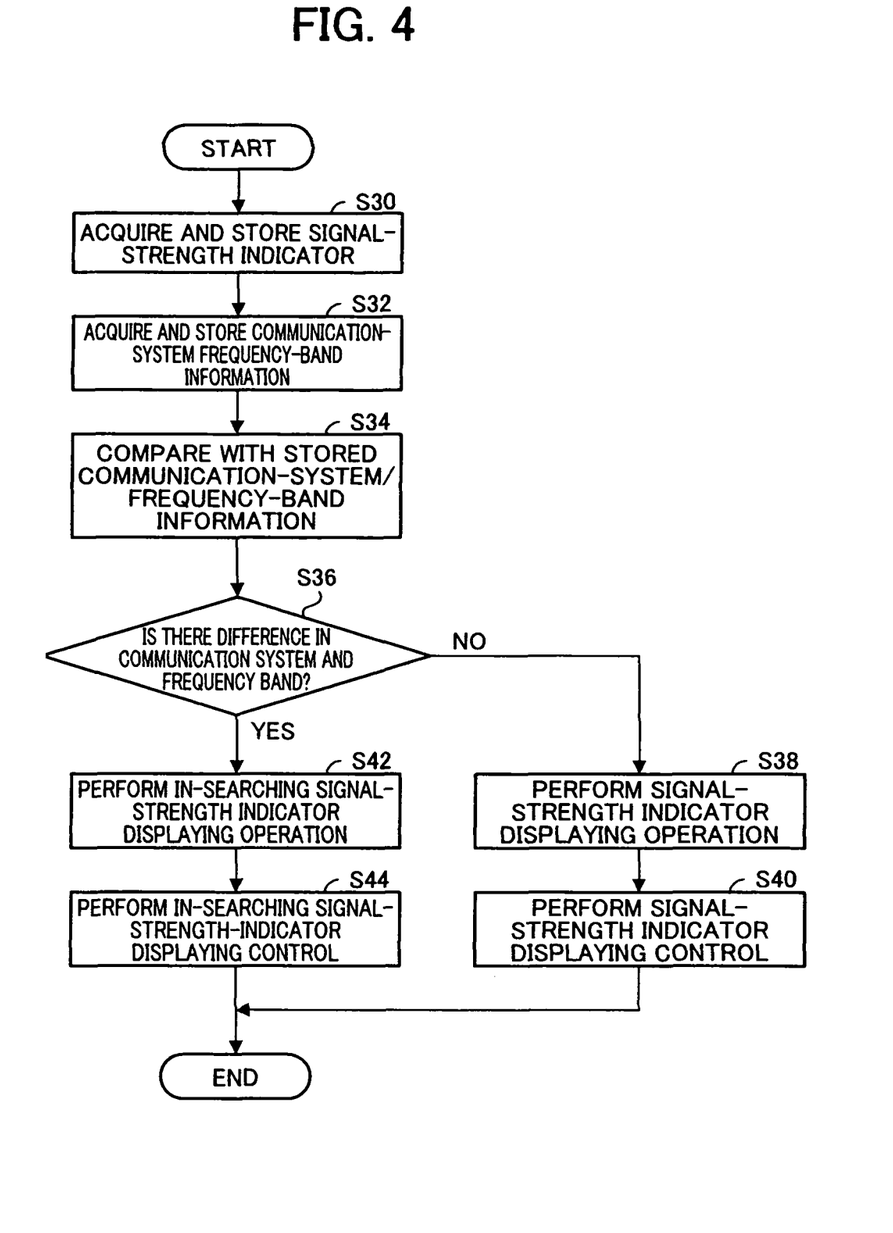
FIG. 4 is a flowchart showing the operation indicating signal strength by a signal-intensity-indicator displaying control section 308 according to the second embodiment while the communication system is switched.

The operation of the second embodiment will be described. FIG. 4 is a flowchart showing the operation of indicating signal strength by the signal-strength-indicator displaying control section 308 according to the second embodiment while the communication system is switched. First, the signal-strength indicator is acquired from the signal-strength-indicator acquiring section 305 (step S30) and the information on the present communication system of the terminal is acquired from the communication-system-information acquiring section 306 (communication-system and available-frequency-band information), and are stored in the signal-strength-indicator and communication-system-information storing section 307 (step S32). Then the communication-system-information comparing section 309 compares the acquired latest communication-system information with the acquired past communication-system information stored in the signal-strength-indicator and communication-system-information storing section 307 (step S34).

Subsequently, it is determined whether the terminal is in "a communication-system searching state", by determining whether the communication systems are different by the comparison result (step S36). For example, the determination of whether the terminal is in "a communication-system searching state" may be made using a communication-system searching determination flag. Specifically, the latest communication-system information and the previous communication-system information are compared in step S34, wherein when they do not agree with each other, the communication-system searching determination flag is turned on, during which it is determined to be in the "searching state"; when the flag is turned off, it is determined not to be in "searching state". Thus the determination flag allows a determination whether the terminal is in "a communication-system searching state".

When it is determined that the terminal is not in a "searching state", a normal signal-strength indicating operation is performed (step S38) and then a process of indicating a signal-strength indicator on the display section 108 is performed (step S40). The normal signal-strength indicating operation has the same function as that of step S16 of the first embodiment.

On the other hand, when it is determined to be in the "searching state" in step S36, a searching signal-strength indicating operation process different from the normal one is performed (step S42) and then a searching signal-strength-indication control process for indicating a signal-strength indicator on the display section 108 is performed (step S44). The searching signal-strength indicating operation different from normal one has the same function as that of Step S20 of the first embodiment. Specifically, additional information such as a flag indicative of nondisplay or blink indication is added to the indication control for the display section 108. The indication is thus switched from the displayed state 500 to the nondisplayed state 501 as shown in FIG. 5 or the indication is blinked by cycling the displayed state 600 and the nondisplayed state 601 alternately at specified intervals as shown in FIG. 6.

There may be a case where a signal-strength indicator fluctuates greatly when searching a signal that is absent at the area during the switching of the communication system because there is no signal-strength-indicator in the area. However, the information on the fluctuation of the signal strength due to the fact that the terminal is searching for a signal that is absent in the area is not so important for the user. Thus, in this case, it is determined to be in a communication-system searching state and so the way of indicating signal strength is switched and as such, indication of information unnecessary for the user can be reduced.

When the user requests to indicate a signal-strength indicator of the "communication-system searching state", a normal signal-strength indicating operation is performed in step S42, and then a process for indicating a signal-strength indicator is performed in step S44 using the operation result. When the user requests to indicate communication-system information of "a communication-system searching state", the name of the communication system that is now searching may be displayed in step S44.

Furthermore, when the user requests both of the signal-strength indication and communication-system indication of "a communication-system searching state", a combination of the two foregoing methods may be employed. For the request for both of the signal-strength indication and communication-system indication of "a communication-system searching state", the user may want to know more detailed information on the communication state during the "communication-system searching state". Accordingly, the indication of the information will increase the convenience for the user.

Furthermore, the user may be allowed to select the method of indication such as blink or nondisplay using the input section 109. Any of the indicators may be specified to the individual terminals. Furthermore, the user may be allowed to select whether to indicate both or one of the signal-strength indicators acquired by the signal-strength-indicator acquiring section 305 and the communication state acquired by the communication-system-information acquiring section 306 using the input section 109. This further improves the convenience for the user.

For the determination of step S36 of whether the terminal is in "a communication-system searching state", a difference in signal strength before and after searching may be calculated, wherein when the difference is more than a specified value, the procedure moves to step S42; when the difference is smaller than a specified value, the procedure moves to step S38. Accordingly, when the signal strengths before and after searching are the same even during searching, the conventional antenna-bar indication can be used, providing advantageous a signal-strength indicator for the user.

The advantages of the first and second embodiments may be provided also in the following cases: in mobile communication terminals incorporating a control function capable of selectively switching multiple radio communication systems and multiple frequency bands to be used supposing the user determines that the signal strength is preferable and therefore executes origination, for example, when three antenna bars are indicated in the idle state of CDMA communication. However, if the communication system switches to wireless LAN at the origination, the signal strength of the wireless LAN becomes bad and the antenna-bar indicator varies from three to zero.

The mobile communication terminal thus gives up connecting to the wireless LAN and is switched to CDMA again so that the number of the antenna-bar indicator returns to three allowing connection. The number of the antenna bars fluctuates from three through zero to three after the origination to the completion of connection, resulting in indicating an unnecessary signal-strength indicator during searching. This may give the user an uncomfortable feeling due to the signal-strength indicator; the signal-strength indicator in the communication-system searching state may be unnecessary for the user.

Accordingly, as in the first and second embodiments, it is monitored as whether the mobile communication terminal is in a communication-system searching state, wherein it is during searching, the method of indicating antenna bars or the method of calculating them from the start of searching to the completion of the searching is devised and the method of indicating antenna bars is controlled. This allows only a necessary signal-strength indicator to be provided to the user, eliminates an uncomfortable feeling due to the antenna-bar indicator, and reduces unnecessary information for the user, thereby allowing advantageous signal-strength indication.

A combination of the first and second embodiments provides the same advantages as those of the first embodiment and the second embodiment, and reduces unnecessary information for the user, thereby allowing advantageous signal-strength indication.

While the present invention has been described with reference to the preferred embodiments, it is intended that the invention be not limited by any of the details of the description therein but includes all the embodiments which fall within the scope of the appended claims.

What is claimed is:

1. A mobile communication terminal having a control function for selectively switching a plurality of radio communication systems or a plurality of frequency bands, the terminal comprising:
   a communication control means for selecting a radio communication system or frequency band from the plurality of radio communication systems or the plurality of frequency bands, controlling communication and managing a communication state based on the selected radio communication system or frequency band;
   a signal-strength information acquisition means for acquiring signal-strength information about a received signal;
   a communication-state acquisition means for acquiring the communication state from the communication control means;
   a switch-over determination means for determining whether the radio communication system or the frequency band selected by the communication control means is being switched-over based on the communication state acquired by the communication-state acquisition means;
   a calculation means for calculating signal-strength display information from the signal-strength information acquired by the signal-strength information acquisition means based on the determination of the switch-over determination means;
   a display means for displaying the signal-strength display information calculated by the calculation means;
   a display control means for performing display control by providing an indication according to the difference between being switched over and not being switched over that is determined by the switch-over determination means when the signal-strength display information is displayed on the display means, the signal-strength display information displayed on the display means being represented by a single indicator;
   a signal-strength information storage means for storing signal-strength information acquired by the signal-strength information acquisition means; and
   a signal-strength information comparison means for comparing previous signal-strength information stored in the signal-strength information storage means with the present signal-strength information acquired by the signal-strength information acquisition means, and calculating a difference between the previous and present signal-strength information; wherein
   the calculation means calculates signal-strength display information from the difference between the previous and present signal-strength information obtained by the signal-strength information comparison means; and
   the display control means performs display control by way of providing an indication according to the difference between the previous and present signal-strength information obtained by the signal-strength information comparison means.

2. The mobile communication terminal according to claim 1, further comprising:
   a communication-system-information acquisition means for acquiring communication-system information including the radio communication system or frequency band selected by the communication control means; and
   a display selection means for selecting whether to display both or at least one of the signal-strength information acquired by the signal-strength information acquisition means and the communication-system information acquired by the communication-system-information acquisition means when the determination by the switch-over determination means shows that the selected system or frequency band is being switched-over.

3. The mobile communication terminal according to claim 1, wherein, when the determination by the switch-over determination means shows that the selected system or frequency band is being switched-over, the display control means blinks the single indicator.

4. The mobile communication terminal according to claim 1, wherein, when the determination by the switch-over determination means shows that the selected system or frequency band is being switched-over, the display control means does not display the single indicator.

5. A mobile communication terminal having a control function for selectively switching a plurality of radio communication systems or a plurality of frequency bands, the terminal comprising:
   a communication control means for selecting a radio communication system or frequency band from the plurality of radio communication systems or the plurality of frequency bands, controlling communication and managing a communication state based on the selected radio communication system or frequency band;
   a signal-strength information acquisition means for acquiring signal-strength information about a received signal;
   a communication-system-information acquisition means for acquiring communication-system information including the radio communication system or the frequency band selected by the communication control means;
   a communication-system-information storage means for storing the communication-system information acquired by the communication-system information acquisition means;
   a communication-system-information comparison means for comparing previous communication-system information stored in the communication-system-information storage means with the present communication-system-information acquired by the communication-system-information acquisition means, and determining whether there is a difference between the previous and present communication-system-information;
   a switch-over determination means for determining whether the radio communication system or the frequency band selected by the communication control means is being switched-over based on the result of comparison by the communication-system-information comparison means;
   a calculation means for calculating signal-strength display information from the signal-strength information acquired by the signal-strength information acquisition means based on the determination by the switch-over determination means;

a display means for displaying the signal-strength display information calculated by the calculation means;

a display control means for performing display control by providing an indication according to the difference between being switched over and not being switched over that is determined by the switch-over determination means when the signal-strength display information is displayed on the display means, the signal-strength display information displayed on the display means being represented by a single indicator;

a signal-strength information storage means for storing signal-strength information acquired by the signal-strength information acquisition means; and a signal-strength information comparison means for comparing previous signal-strength information stored in the signal-strength information storage means with the present signal-strength information acquired by the signal-strength information acquisition means, and calculating a difference between the previous and present signal-strength information; wherein the calculation means calculates signal-strength display information from the difference between the previous and present signal-strength information obtained by the signal-strength information comparison means; and the display control means performs display control by way of providing an indication according to the difference between the previous and present signal-strength information obtained by the signal-strength information comparison means.

6. The mobile communication terminal according to claim 5, further comprising:

a display selection means for selecting whether to display both or at least one of the signal-strength information acquired by the signal-strength information acquisition means and the communication-system information acquired by the communication-state-information acquisition means when the determination by the switch-over determination means shows that the selected system or frequency band is being switched-over.

7. The mobile communication terminal according to claim 5, wherein, when the determination by the switch-over determination means shows that the selected system or frequency band is being switched-over, the display control means blinks the single indicator.

8. The mobile communication terminal according to claim 5, wherein, when the determination by the switch-over determination means shows that the selected system or frequency band is being switched-over, the display control means does not display the single indicator.

9. A method for displaying signal-strength of a mobile communication terminal having a control function for selectively switching a plurality of radio communication systems or a plurality of frequency bands, the method comprising the steps of:

a) selecting a radio communication system or frequency band from the plurality of radio communication systems or the plurality of frequency bands, controlling communication and managing a communication state based on the selected radio communication system or frequency band;

b) acquiring signal-strength information about a received signal and the communication state from step a);

c) determining whether the radio communication system or the frequency band selected by step a) is being switched-over based on the acquired communication state;

d) calculating signal-strength display information from the acquired signal-strength information based on the determination of step c);

e) performing display control by providing an indication according to a difference between being switched over and not being switched over that is determined by step c) when the calculated signal-strength display information is displayed;

f) displaying a single indicator representing the signal-strength display information;

g) storing the signal-strength information acquired by step b); and h) comparing previous signal-strength information stored in step g) with present signal-strength information acquired by step b), and calculating a difference between the previous and present signal-strength information;

wherein step d) calculates the signal-strength display information from the difference between the previous and present signal-strength information obtained by step h); and step e) performs display control by providing an indication according to the difference between the previous and present signal-strength information obtained by step h).

10. A method for displaying signal-strength of a mobile communication terminal having a control function for selectively switching a plurality of radio communication systems or a plurality of frequency bands, the method comprising the steps of:

a) selecting a radio communication system or frequency band from the plurality of radio communication systems or the plurality of frequency bands, controlling communication and managing a communication state based on the selected radio communication system or frequency band;

b) acquiring signal-strength information about a received signal, a communication state, and communication-system information including a radio communication system or a frequency band selected by step a);

c) storing the communication-system information acquired by step b);

d) comparing previous communication-system information stored in step c) with the present communication-system information acquired by step b) to determine whether there is a difference between the previous and present communication-system information;

e) determining whether the radio communication system or the frequency band is being switched-over based on the result of comparison of step d);

f) calculating signal-strength display information from the acquired signal-strength information based on the determination of step e);

g) performing display control by providing an indication according to a difference between being switched over or not being switched over that is determined by step e) when the calculated signal-strength display information is displayed;

h) displaying a single indicator representing the signal-strength display information;

i) storing the signal-strength information acquired by step b); and j) comparing previous signal-strength information stored in step i) with present signal-strength information acquired by step b), and calculating a difference between the previous and present signal-strength information;

wherein step f) calculates the signal-strength display information from the difference between the previous and present signal-strength information obtained by step j); and step g) performs display control by way of providing an indication according to the difference between the previous and present signal-strength information obtained by step j).

* * * * *